UNITED STATES PATENT OFFICE.

JAMES E. KEEFE, OF CHICAGO, ILLINOIS.

DENTIFRICE.

1,211,712. Specification of Letters Patent. Patented Jan. 9, 1917.

No Drawing. Application filed April 5, 1916. Serial No. 89,014.

*To all whom it may concern:*

Be it known that I, JAMES E. KEEFE, a citizen of the United States, residing in Chicago, in the county of Cook and State of Illinois, have invented a certain new and useful Improvement in Dentifrices, of which the following is a specification.

My invention relates to dentifrices.

Heretofore in preparing tooth powders and pastes it has been customary to provide as a base or body a gritty cleansing material, such as pumice, prepared chalk, cuttle fish, whiting, etc., all of which are insoluble or substantially insoluble in water.

Gritty cleansing material is found to be necessary for cutting into and removing the material deposited upon the surfaces of the teeth and for polishing the same. Through use some of the insoluble gritty substances lodges around the neck of the teeth and becomes a depository for infection and foreign matter, as well as becoming a source of irritation. Particularly is this the case where the teeth and gums are diseased or subject to injury.

My invention aims to provide a tooth paste or powder employing a soluble grit only.

Disease of the gums and teeth, particularly pyorrhea is common and widespread. The initial stages of this disease are usually neglected by the individual—in fact the early stages of the disease usually go unnoticed. The specialist is consulted only after the condition has become acute and the teeth and gums actually painful. Proper treatment usually checks the disease promptly and enables the natural processes of healing and recovery to begin. Recovery is, however, very slow and the natural tendency for the patient is to discontinue the services of the specialist before recovery is fully effected. During such weakened condition of the teeth and gums, irritation aggravates the weakness and reinfection is particularly likely to occur. The patient generally cleans the teeth regularly after he becomes aware of the diseased condition. The insoluble matter which comprises the body of dentifrices heretofore employed becomes lodged in the pockets formed in the gums and becomes a source of irritation which materially retards recovery. I have found that the employment of a soluble grit only prevents this difficulty as the gritty material, instead of forming an insoluble deposit, will go into solution with the liquids that are present in the oral cavity as soon as its function of cleaning and polishing is effected and thus prevents any permanent deposit and consequent irritation.

One material which I find to be suitable to employ as the base or body of the dentifrice is lactose. This is a form of hard crystalline sugar which is less soluble than cane or beet sugar, and which feels gritty between the teeth. This substance may be mixed with other materials in the dry form when it is desired to prepare a tooth powder.

In preparing a paste, I employ a liquid or semi-liquid substance in which the lactose is insoluble. For this purpose I have found glycerin to be a suitable carrier as the above named grit is insoluble therein, but both the grit and the carrier are soluble in water although in different degrees.

In order to indicate to those skilled in the art the relative proportions that I have found to comprise a proper composition, I shall now set forth as an illustration of one embodiment of my invention a complete formula for a dentifrice in paste form.

Powdered soap ___ 1 part (by weight)
Sugar of milk ____ 15 parts
Glycerin _____ 3 parts
Water _____ 1 part
Formalin _____ Less than 1%
Flavor _____ q. s.

The tooth paste thus prepared may serve as a carrier for a germicide either general or specific. I have found that the soluble grit is particularly valuable for carrying a specific amebacide such as ipecac or its derivaties and formalin into the pockets and cavities formed by such infection, as this form of grit or body is particularly useful in carrying out the invention described in my copending application, Serial No. 17,714 filed March 29th 1915.

It is apparent that a powder may be prepared by omitting the glycerin and water.

I do not intend to limit myself to the employment of any one soluble grit as it is apparent that other substances of a similar character may be employed. I have found lactose or sugar of milk to be suitable as it has just enough grit to cleanse the teeth and it becomes soluble immediately after it is broken down by the brushing. I have found that salt may be similarly used but the proportion used should remain low on account of the consequent taste. Other suitable non-irritant substances which have the necessary cleansing properties and are soluble in water may be employed. Crystalline materials are peculiarly adapted to this purpose as the sharp surfaces are particularly valuable in cleaning and polishing the teeth, but should not be hard enough to injure the enamel.

I do not intend to be limited to the employment of glycerin as a carrier as any other suitable substance may be employed for this purpose. I have used glucose with good success. The essential requirement is that the grit which is soluble in the liquids present in the oral cavity shall be insoluble in the carrier but the carrier itself should be soluble in those liquids.

What I claim is:

1. In a dentifrice, the combination of a crystalline grit one part of which by weight is soluble in less than approximately twenty-five parts by weight of water at room temperature, and a carrier for said grit, said grit being insoluble in said carrier, said dentifrice being free of any less soluble grit.

2. In a dentifrice, the combination of a crystallized abrasive as a grit one part of which by weight is soluble in less than approximately twenty-five parts by weight of water at room temperature, and a suitable germicide, said dentifrice being free of any less soluble grit.

3. In a dentifrice, the combination of a crystalline abrasive forming a grit one part of which by weight is soluble in less than approximately twenty-five parts by weight of water at room temperature, a suitable germicide, and a carrier for said grit, said grit being insoluble in said carrier, said dentifrice being free of any less soluble grit.

4. In a dentifrice, the combination of sugar of milk and glycerin, the sugar of milk being present in such quantities as to form a grit and the glycerin acting as a carrier, said dentifrice being free of any material less soluble than one part by weight in approximately twenty-five parts by weight of water at room temperature.

In witness whereof, I hereunto subscribe my name this first day of April, A. D. 1916.

JAMES E. KEEFE.